(12) United States Patent
Ando

(10) Patent No.: US 9,312,974 B2
(45) Date of Patent: Apr. 12, 2016

(54) MASTER APPARATUS AND SLAVE APPARATUS AND TIME-SYNCHRONIZATION METHOD

(75) Inventor: Yasuomi Ando, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 144 days.

(21) Appl. No.: 13/983,396

(22) PCT Filed: Feb. 25, 2011

(86) PCT No.: PCT/JP2011/054355
§ 371 (c)(1),
(2), (4) Date: Aug. 2, 2013

(87) PCT Pub. No.: WO2012/114517
PCT Pub. Date: Aug. 30, 2012

(65) Prior Publication Data
US 2013/0336340 A1    Dec. 19, 2013

(51) Int. Cl.
*H04J 3/06* (2006.01)
*H04L 12/40* (2006.01)
*H04L 12/403* (2006.01)

(52) U.S. Cl.
CPC .............. *H04J 3/0658* (2013.01); *H04J 3/0682* (2013.01); *H04L 12/403* (2013.01); *H04L 12/40019* (2013.01); *H04L 12/4035* (2013.01); *G06F2213/0038* (2013.01); *H04L 2012/4026* (2013.01)

(58) Field of Classification Search
CPC ..................................................... H04J 3/0658
See application file for complete search history.

(56) References Cited

U.S. PATENT DOCUMENTS 4,594,705 A    6/1986    Yahata et al.
6,665,315 B1   12/2003   Karasawa
(Continued)

FOREIGN PATENT DOCUMENTS

JP    01 302939    12/1989
JP    05 199212    8/1993
(Continued)

OTHER PUBLICATIONS

International Search Report Issued Apr. 19, 2011 in PCT/JP11/054355 Filed Feb. 25, 2011.
(Continued)

*Primary Examiner* — Brian D Nguyen
*Assistant Examiner* — Toan Nguyen
(74) *Attorney, Agent, or Firm* — Oblon, McClelland, Maier & Neustadt, L.L.P.

(57) ABSTRACT

A master apparatus repeatedly executes an offset value calculation notification sequence in which a calculation of an offset value for correcting a transmission path delay is implemented after communications with the plurality of slave apparatuses, and a notification of the offset value calculated to the plurality of slave apparatuses is implemented Every time the offset value calculation notification sequence is executed, the master apparatus notifies the slave apparatuses of a sequence identifier which is the identifier of the offset value calculation notification sequence. Furthermore, the master apparatus selects a sequence identifier from among two or more sequence identifiers already notified to each slave apparatus, notifies the selected sequence identifier to each slave apparatus, and instructs each slave apparatus to use, for time-synchronization, an offset value notified in the offset value calculation notification sequence corresponding to the selected sequence identifier.

15 Claims, 10 Drawing Sheets

(56) References Cited

U.S. PATENT DOCUMENTS

| | | | | |
|---|---|---|---|---|
| 7,818,457 | B1* | 10/2010 | Flood et al. | 709/248 |
| 2007/0086487 | A1* | 4/2007 | Yasuda et al. | 370/503 |
| 2008/0141091 | A1* | 6/2008 | Kalluri | 714/748 |
| 2008/0259966 | A1* | 10/2008 | Baird et al. | 370/503 |
| 2009/0147806 | A1* | 6/2009 | Brueckheimer | 370/503 |
| 2010/0329125 | A1* | 12/2010 | Roberts et al. | 370/241.1 |

FOREIGN PATENT DOCUMENTS

| | | |
|---|---|---|
| JP | 05 227184 | 9/1993 |
| JP | 200 049836 | 2/2000 |
| JP | 2000 078170 | 3/2000 |
| JP | 2000 165428 | 6/2000 |
| JP | 2001 177570 | 6/2001 |
| JP | 2002 014185 | 1/2002 |
| JP | 2005 253033 | 9/2005 |
| JP | 2005 286720 | 10/2005 |
| JP | 2009 130519 | 6/2009 |

OTHER PUBLICATIONS

German Office Action issued Oct. 31, 2014, in German Patent Application No. 11 2011 104 955.2 (with English translation).

* cited by examiner

Fig. 6

| SyncID | MeasureID | Offset [μs] |
|---|---|---|
| 1 | 1 | 12 |
| 1 | 2 | 13 |
| 1 | 3 | 11 |
| 2 | 2 | 15 |
| ... | ... | ... |

Fig. 7

| SyncID | MeasureID | Roundtrip [μs] | Offset [μs] |
|---|---|---|---|
| 1 | 1 | 3 | 12 |
| 1 | 2 | 2 | 13 |
| 2 | 1 | 2 | 11 |
| ... | ... | ... | ... |

MASTER APPARATUS AND SLAVE APPARATUS AND TIME-SYNCHRONIZATION METHOD

TECHNICAL FIELD

The present invention relates to a time-synchronization technique for synchronizing a plurality of communication devices among themselves.

BACKGROUND ART

The time-synchronization procedure of a conventional synchronization system includes five steps:
(1) Delay measurement,
(2) Offset calculation,
(3) Notification,
(4) Confirmation, and
(5) Synchronization,
each of which is implemented in a series of operations (e.g., Patent Literature 1).

A detailed description thereof is given below.

In the (1) Delay measurement step, a communication device (master apparatus) that holds a reference time for synchronization measures a transmission path delay to another communication device (slave apparatus).

This is because the measurement of a transmission path delay helps to implement a more accurate synchronization.

In a connection configuration of a star type, a tree type, a line type, or a mixed type thereof, there are one or more slave apparatuses located at the terminal ends of the master apparatus.

Every slave apparatus belongs to one of routes leading to the terminal slave apparatuses.

The line type is a connection configuration involving relays performed by slave apparatuses having two or more ports and a function to relay a frame between the ports.

The master apparatus transmits a frame for measurement (hereafter, "Measure frame") to a terminal slave apparatus on each route so as to measure a transmission delay.

The Measure frame is addressed to a terminal slave apparatus and transmitted on each route.

The terminal slave apparatus, upon receipt of the Measure frame, transmits a response frame (hereafter, "MearueAck frame") for measurement by return.

All the slave apparatuses on the route through which the Measure frame passes relay the Measure frame.

In that process, each slave apparatus records the arrival time of the Measure frame and the arrival time of the MeasureAck frame, calculates the time difference ("roundtrip time tr"), and records the calculated roundtrip time tr.

The master apparatus calculates the roundtrip time tr based on the transmission time of the Measure frame and the arrival time of the MeasureAck frame.

The terminal slave apparatuses calculate the roundtrip time tr based on the arrival time of the Measure frame and the transmission time of the MeasureAck frame.

In the (2) Offset calculation step, the master apparatus calculates time ("offset value o") for the slave apparatus, based on the roundtrip time tr and time ts being the terminal time of the master apparatus, which is from the transmission of a frame for synchronization (hereafter, "Sync frame") until a synchronization time point. The time ("offset value o") for the slave apparatus is time from the slave apparatus receiving the Sync frame until the synchronization time point.

The calculation formula is: $o = ts - (tr/2)$.

In the (3) Notification step, the master apparatus distributes the offset value o to each slave apparatus.

The master apparatus transmits a frame for distributing the offset value o (hereafter, "Offset frame") on the same route as that of the Measure frame to distribute the offset value o to each slave apparatus.

Each slave apparatus calculates time ("delay time os") to the synchronization time point based on the received offset value o and the roundtrip time tr recorded therein.

The calculation formula is: $os = (tr/2) + o$.

In the (4) Confirmation step, the master apparatus instructs each slave apparatus to use the distributed offset value o.

Specifically, the master apparatus broadcasts a frame for confirmation (hereafter, "Update frame") to notify all the slave apparatuses of the use of the offset value o.

In the (5) Synchronization step, the master apparatus notifies each slave of synchronization timing.

Specifically, the master apparatus broadcasts the frame for synchronization (hereafter, "Sync frame") to notify each slave apparatus of the synchronization timing.

Each slave apparatus uses the delay time os which is the time until the synchronization time point, based on the time point when the Sync frame is received, so as to obtain the synchronization time.

CITATION LIST

Patent Literature

Patent Literature 1: JP 2009-130519 A

SUMMARY OF INVENTION

Technical Problem

The problem of the conventional transmission path delay measurement is that there is no scheme for applying delay measurement results in the system as a whole.

For example, gradually adding slave apparatuses to a network causes an unstable delay measurement.

More specifically, in a case where there is a change in slave apparatuses connected to a network, like a case where slave apparatuses are gradually added to a network, it is likely that a highly accurate synchronization cannot be achieved with the offset value determined based on a transmission delay measured immediately after the change in the slave apparatuses connected to the network.

Thus, until the delay measurement is stabilized, a stable synchronization can be achieved with a previous result of delay measurement obtained in a stable period rather than with the latest result of delay measurement.

A main objective of the present invention is to solve problems such as that described above, that is, to achieve a stable synchronization even immediately after a change in slave apparatuses connected to a network.

Solution to Problem

A master apparatus according to the present invention is connected to a plurality of slave apparatuses via a transmission path and performs time-synchronization with the plurality of slave apparatuses. The master apparatus includes:

a sequence executing section that repeatedly executes an offset value calculation notification sequence in which a calculation of an offset value for correcting a transmission path delay is implemented after communications with the plurality of slave apparatuses, and a notification of the offset value calculated to the plurality of slave apparatuses is implemented;

a sequence identifier notifying section that notifies the plurality of slave apparatuses, every time the offset value calculation notification sequence is executed by the sequence executing section, of a sequence identifier which is an identifier of the offset value calculation notification sequence; and an offset value instructing section that selects a sequence identifier from among sequence identifiers already notified to the plurality of slave apparatuses by the sequence identifier notifying section, notifies the plurality of slave apparatuses of a selected sequence identifier, and instructs the plurality of slave apparatuses to use, for the time-synchronization, an offset value notified in the offset value calculation notification sequence corresponding to the selected sequence identifier.

Advantageous Effects of Invention

According to the present invention, the master apparatus selects a sequence identifier from among sequence identifiers already notified to each slave apparatus, notifies each slave apparatus of the selected sequence identifier, and instructs each slave apparatus to use, for time-synchronization, an offset value notified in an offset value calculation notification sequence corresponding to the selected sequence identifier.

Thus, during an unstable period immediately after a change in slave apparatuses connected to a network, an offset value of a previous stable period can be selected to be used by each slave apparatus. This allows a stable synchronization even immediately after the change in slave apparatuses connected to the network.

BRIEF DESCRIPTION OF DRAWINGS

FIG. 6 shows an example of a record table in the master apparatus, according to the first embodiment.

FIG. 7 shows an example of a record table in the slave apparatus, according to the first embodiment.

DESCRIPTION OF EMBODIMENTS

Embodiment 1

In a first embodiment, a description is given of a configuration to improve system stability with a stable synchronization even when slave devices are gradually added to a network, or the like.

Like the conventional art case, the time-synchronization procedure of this embodiment is composed of the five steps:
(1) Delay measurement,
(2) Offset calculation,
(3) Notification,
(4) Confirmation, and
(5) Synchronization.

The sequence composed of (1) Delay measurement, (2) Offset calculation, and (3) Notification is referred to as an offset value calculation notification sequence.

In the offset value calculation notification sequence, data is transmitted/received between the master apparatus and slave apparatuses; and the master apparatus calculates an offset value o for correcting a transmission path delay and notifies the salve apparatuses of the offset value o.

Figure 1:
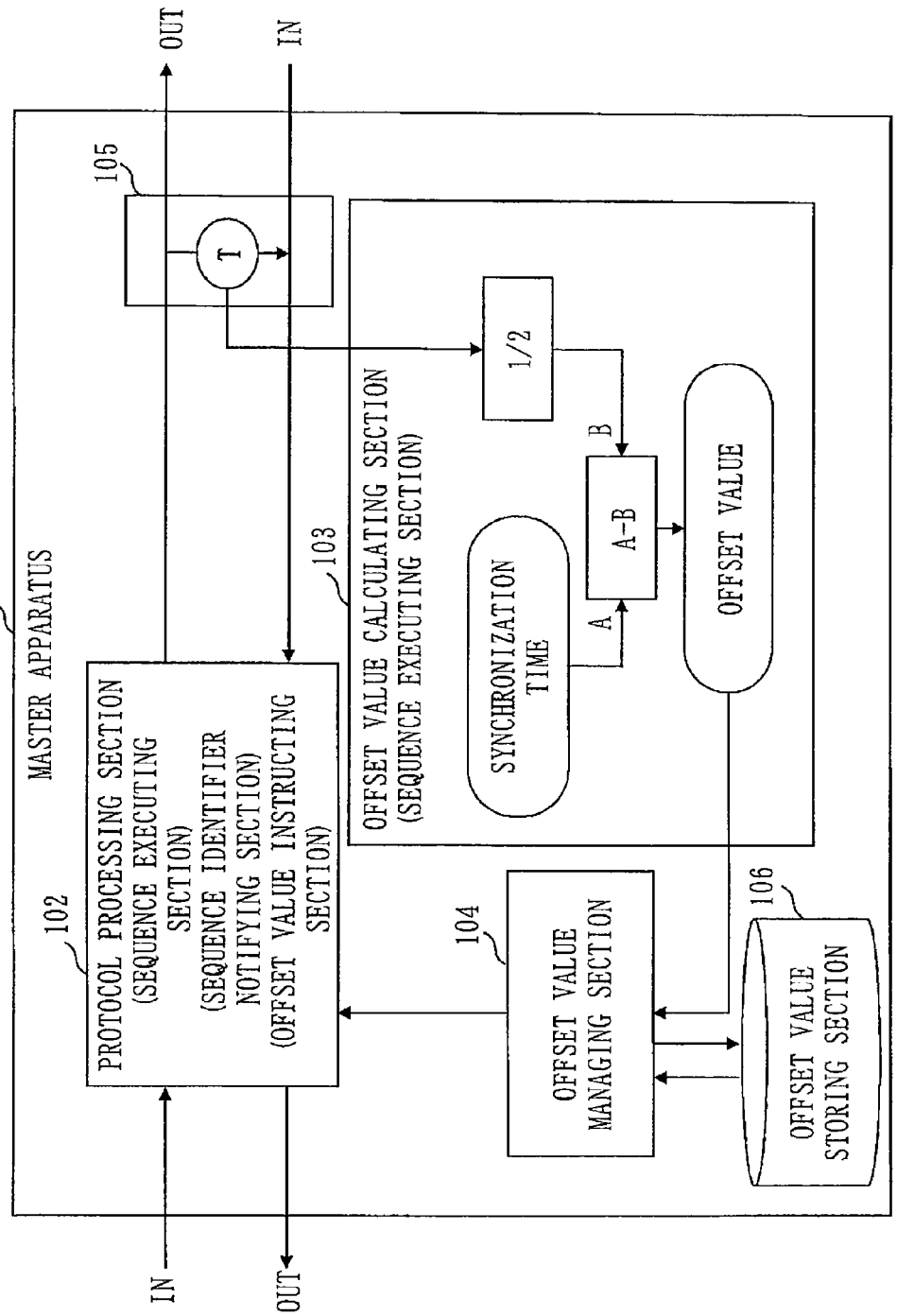
FIG. 1 shows a configuration example of a master apparatus, according to a first embodiment.

FIG. 1 shows a configuration example of a master apparatus 101, according to this embodiment.

Figure 2:
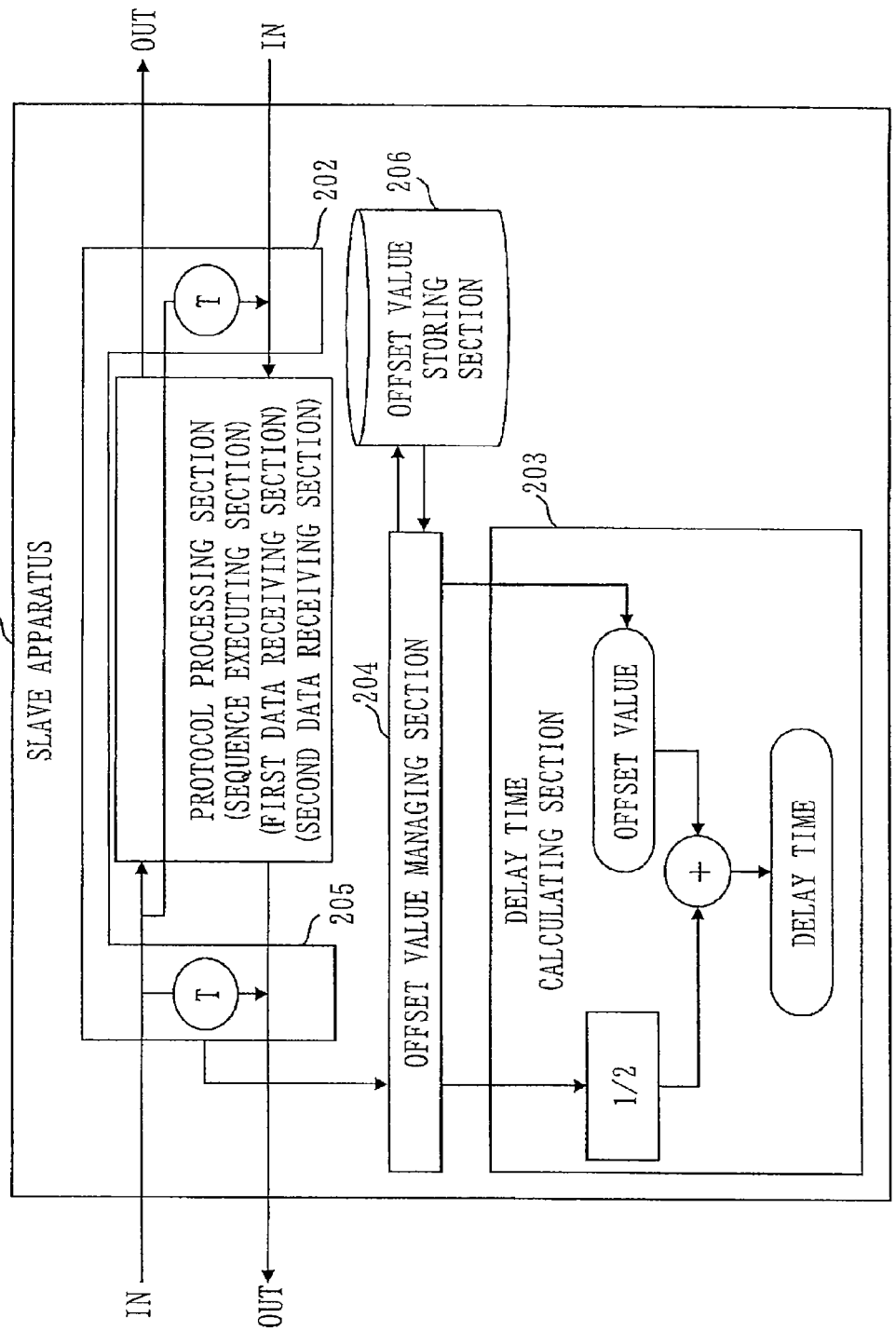
FIG. 2 shows a configuration example of a slave apparatus, according to the first embodiment.

FIG. 2 shows a configuration example of a slave apparatus 201, according to this embodiment.

Time-synchronization is performed between the master apparatus 101 and the slave apparatus 201.

Referring to FIG. 1, a protocol processing section 102 processes the generation, transmission, and reception of frames.

More specifically, the protocol processing section 102 repeats executing the offset value calculation notification sequence through generating, transmitting and receiving frames, calculates the offset value o in each offset value calculation notification sequence, and notifies each slave apparatus 201 of the calculated offset value o.

Further, every time the offset value calculation notification sequence is executed, the protocol processing section 102 notifies each slave apparatus 201 of a sequence identifier (hereafter, "SyncID") which is an identifier for the offset value calculation notification sequence.

Further, the protocol processing section 102 selects any sequence identifier from among two or more sequence identifiers already notified to each slave apparatus 201, notifies each slave apparatus 201 of the selected sequence identifier, and instructs each slave apparatus 201 to use, for time-synchronization, the notified offset value o in the offset value calculation notification sequence corresponding to the selected sequence identifier.

The protocol processing section 102 is examples of a sequence executing section, a sequence identifier notifying section, and an offset value instructing section.

An offset value calculating section 103 calculates the offset value o for the slave apparatus 201 which is an offset from the reception of a Sync frame until a synchronization time point based on roundtrip time tr and time is being the internal time of the master apparatus 101, which is from the transmission of the Sync frame until the synchronization time point.

The offset value calculating section 103 also corresponds to an example of the sequence executing section.

An offset value managing section 104 manages the offset value o, with the sequence identifier and a route identifier as keys.

An offset value storing section 106 stores the offset value o, with the sequence identifier and the route identifier as keys.

A roundtrip time measuring section 105 measures time from the transmission of a Measure frame until the reception of a MeasureAck frame.

Referring to FIG. 2, a protocol processing section 202 processes the transmission and reception of frames.

More specifically, the protocol processing section 202 repeats executing the offset value calculation notification sequence with the master apparatus 101, through transmitting and receiving frames, measures a transmission path delay ("roundtrip time tr") in each offset value calculation notification sequence, and receives a notification of the offset value o from the master apparatus 101.

Further, when the offset value calculation notification sequence is executed, the protocol processing section 202 receives an Update frame (example of first sequence identifier notification data) for notifying the sequence identifier ("SyncID") being the identifier for the offset value calculation notification sequence, transmitted from the master apparatus 101.

Further, the protocol processing section 202 receives the Sync frame (example of second selected sequence identifier notification data) transmitted from the master apparatus 101, for notifying the selected sequence identifier by the master apparatus 101.

The protocol processing section 202 is examples of the sequence executing section, a first data receiving section and a second data receiving section.

An offset value managing section 204 manages the roundtrip time tr and the offset value o, with the sequence identifier and the route identifier as keys.

Further, the offset value managing section 204 selects the roundtrip time tr and the offset value 0, both of which are stored in relation to the selected sequence identifier notified in the Sync frame, as the roundtrip time and the offset value for time-synchronization with the master apparatus 101.

An offset value storing section 206 stores, by relating the round trip time tr and the offset value 0 and the sequence identifier to each other, the roundtrip time tr being measured in the offset value calculation notification sequence, the offset value o being notified in the offset value calculation notification sequence, and the sequence identifier for the offset value calculation notification sequence being notified by the Update frame.

A delay time calculating section 203 calculates delay time os, which is time until the synchronization time point, based on the offset value o and the roundtrip time tr both selected by the offset value managing section 204.

A roundtrip time measuring section 205 measures time from the reception of the Measure frame until the reception of the MeasureAck frame or until the transmission of the MeasureAck frame.

Figure 3:
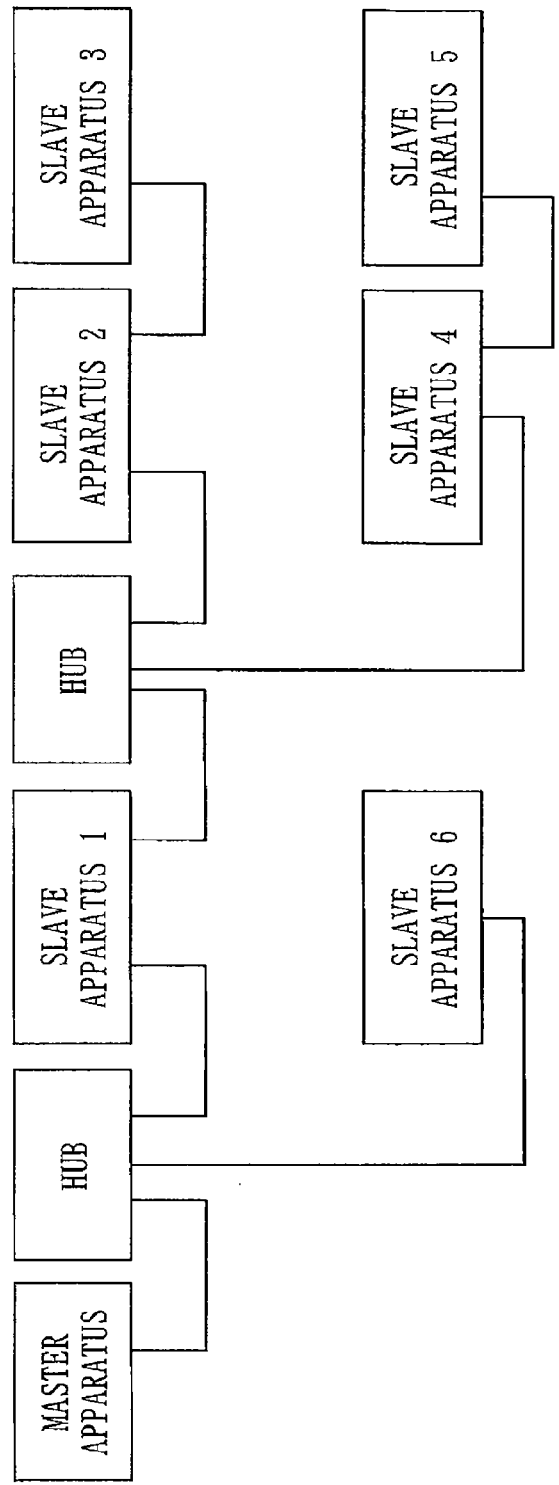
FIG. 3 shows a connection example of the master apparatus and slave apparatuses, according to the first embodiment.

FIG. 3 shows an example of the connection configuration of the master apparatus 101 and slave apparatuses 201, according to this embodiment.

The connection configuration of FIG. 3 includes the master apparatus 101 and six slave apparatuses 201.

In the case of the connection shown in FIG. 3, there are three routes in total from the master apparatus 101 to terminal slave apparatuses.

This includes a route to a slave apparatus 3, a route to a slave apparatus 5, and a route to a slave apparatus 6.

On each route, one or more slave apparatuses 201 are connected in cascade.

Specifically, the transmission path connected to the master apparatus 101 branches at the first hub off to a route to the slave apparatus 3 plus a route to the slave apparatus 5, and a route to the slave apparatus 6.

The transmission path also branches at the second hub off to the route to the slave apparatus 3 and the route to the slave apparatus 5.

Figure 4:
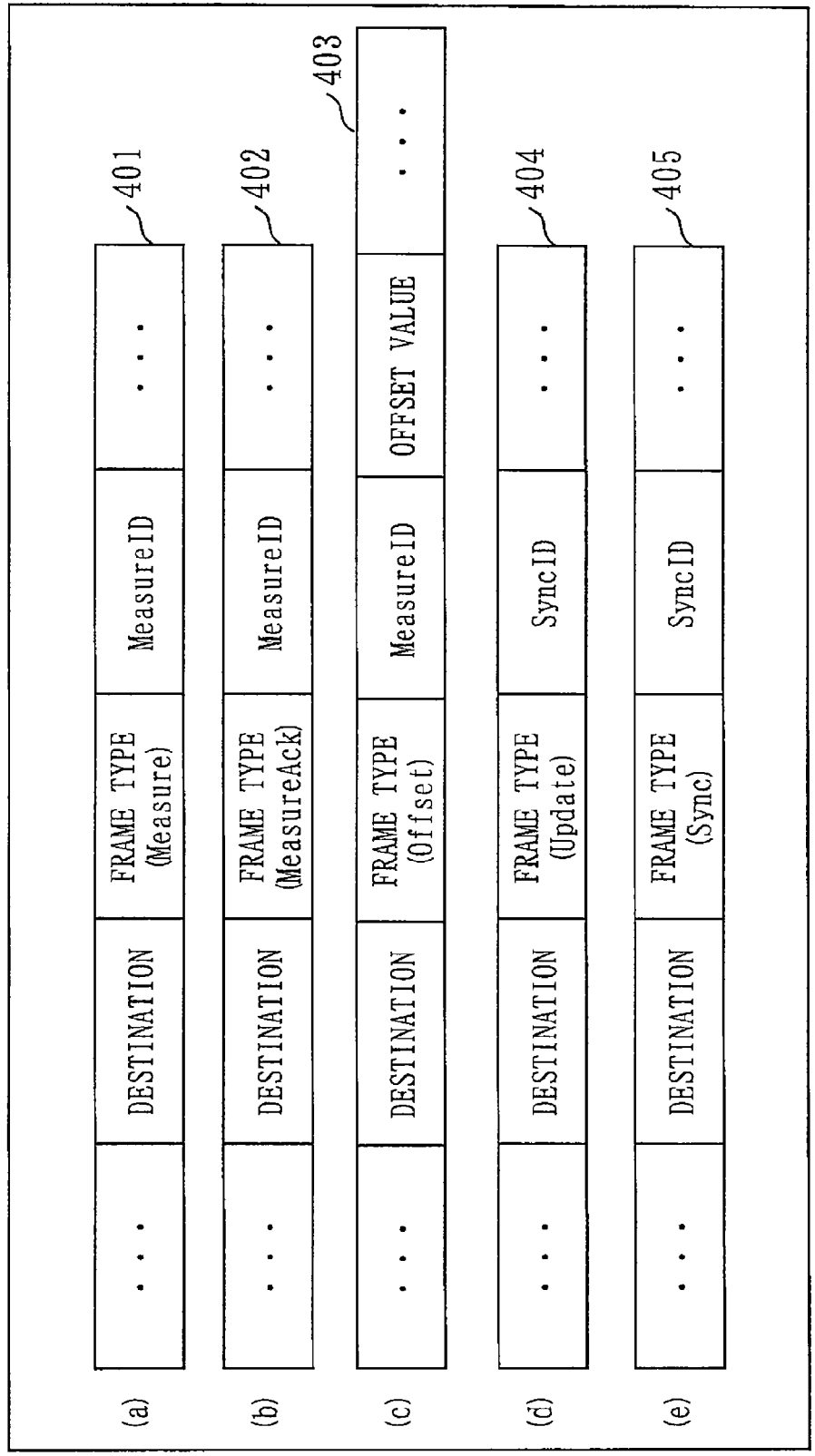
FIG. 4 shows examples of a frame to be transmitted/received between the master apparatus and slave apparatuses, according to the first embodiment.

FIG. 4 shows examples of the field configuration of a frame to be transmitted/received between the master apparatus 101 and the slave apparatus 201.

In FIG. 4, (a) illustrates an example of the field configuration of a Measure frame 401.

In FIG. 4, (b) illustrates an example of the field configuration of a MeasureAck frame 402.

In FIG. 4, (c) illustrates an example of the field configuration of an Offset frame 403.

In FIG. 4, (d) illustrates an example of the field configuration of an Update frame 404.

In FIG. 4, (e) illustrates an example of the field configuration of a Sync frame 405.

The Measure frame 401 includes a destination, a frame identifier ("frame ID") identifying the frame as the Measure frame, and a route identifier ("MeasureID").

The Measure frame 401 is a frame to be used for a transmission path delay measurement in each slave apparatus 201, which is an example of delay measurement data.

The MeasureAck frame 402 includes a destination, a frame ID identifying the frame as the MeasureAck frame, and the MeasureID.

The MeasureAck frame 402 is the Measure frame 401 returned from that last slave apparatus, which is an example of returned delay measurement data.

The Offset frame 403 includes a destination, a frame ID identifying the frame as the Offset frame, a Measure ID, and the offset value o.

The Offset frame 403 is a frame for notifying the slave apparatuses 201 of the offset value o, which is an example of offset value notification data.

The Update frame 404 includes a destination, a frame ID identifying the frame as the Update frame, and the sequence identifier ("SyncID").

The Update frame 404 is examples of sequence identifier notification data and first sequence identifier notification data.

The Sync frame 405 includes a destination, a frame ID, SyncID, identifying the frame as the Sync frame.

The Sync frame 405 is examples of synchronization timing notification data and second sequence identifier notification data. The Sync ID notified of the Sync frame 405 corresponds to the selected sequence identifier.

Now, an operation is described.

The time-synchronization procedure according to this embodiment is composed of the five steps:
(1) Delay measurement,
(2) Offset calculation,
(3) Notification,
(4) Confirmation, and
(5) Synchronization,
each of which is executed in a series of operations, as described earlier.

Figure 5:
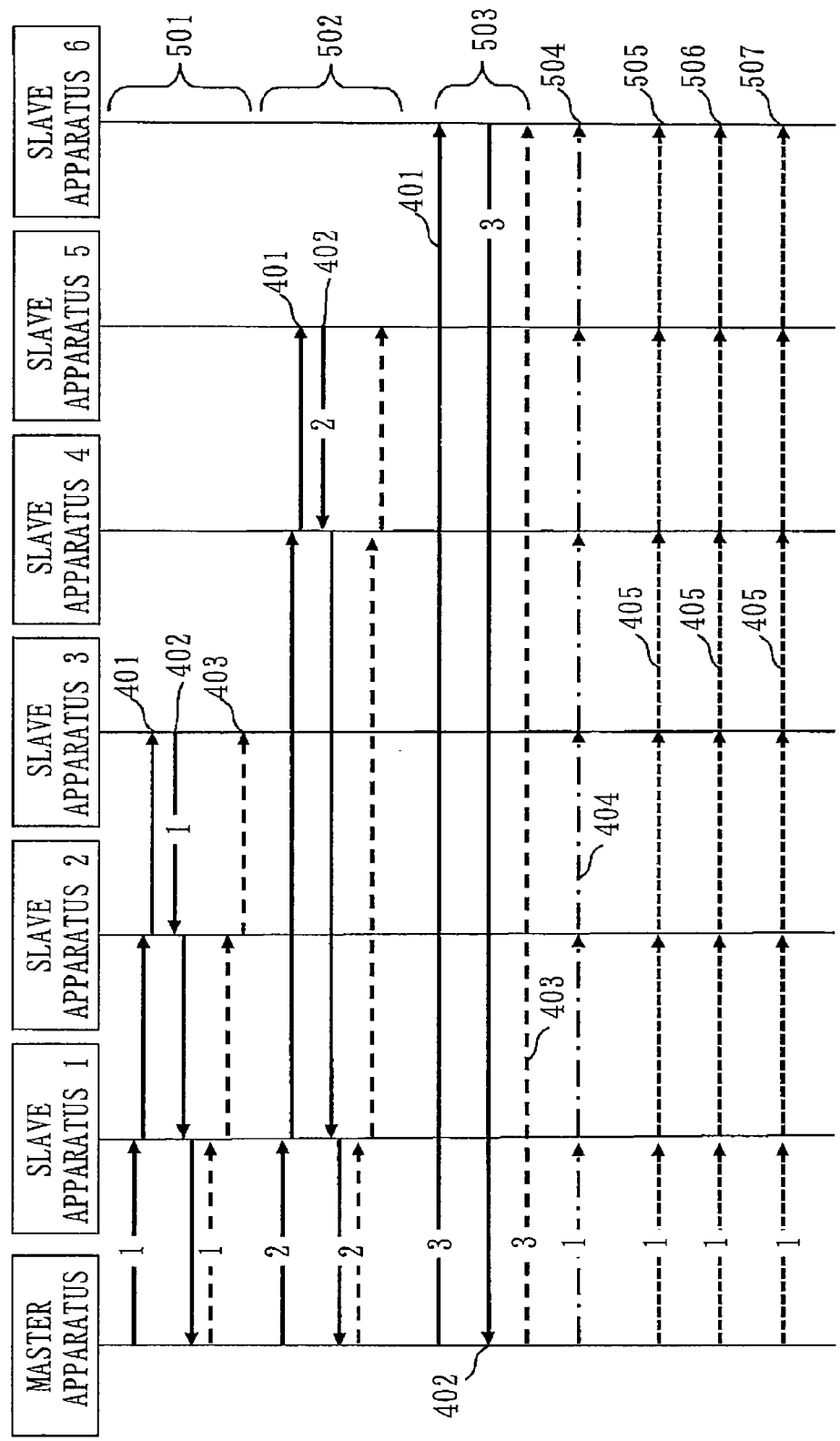
FIG. 5 shows examples of frame transmission/reception procedures between the master apparatus and slave apparatuses, according to the first embodiment procedure

An example of the operations of the master apparatus 101 and slave apparatuses 201 according to this embodiment is described mainly with reference to FIG. 5.

Referring to FIG. 5, an arrow 401 (master-to-slave arrow) indicates the Measure frame, an arrow 402 (slave-to-master arrow) indicates the MeasureAck frame, and an arrow 403 (master-to-slave arrow) indicates the Offset frame.

An arrow 404 (master-to-slave arrow) indicates an Update frame, and an arrow 405 (master-to-slave arrow) indicates a Sync frame In the figure, although not every arrow has a reference number assigned, for drawing convenience, arrows of the same type indicate the same frame.

The sign-frame relation for 401 to 405 of FIG. 5 corresponds to the sing-frame relation for 401 to 405 of FIG. 4.

Numbers on the arrows of the Measure frame, the MeasureAck frame, and the Offset frame indicate route identifiers ("MeasureID").

Numbers on the arrows of the Update frame and the Sync frame indicate sequence identifiers ("SyncID").

In the (1) Delay measurement step (501 to 503), the master apparatus 101 measures the transmission path delay to the slave apparatuses 201.

In the delay measurement, the protocol processing section 102 in the master apparatus 101 transmits the Measure frame 401 destined for a terminal slave apparatus.

There may be two or more terminal slave apparatuses, and so may be the routes.

Thus, the protocol processing section 102 transmits the Measure frame 401 for each route.

The Measure frame 401 and the MeasureAck frame 402 include the MeasureID as a route identifier.

The slave apparatus 1 shown in FIG. 3 belongs to two routes (one is the route having the slave apparatus 3 as the terminal slave apparatus and the other is the route having the slave apparatus 5 as the terminal slave apparatus). However the MeasureID is referred to, to identify the route which the frame is destined for.

A terminal slave apparatus upon receipt of the Measure frame 401, transmits the MeasureAck frame 402.

In every slave apparatus 201 on the routes, the protocol processing section 202 receives the Measure frame 401 and the MeasureAck frame 402, and the roundtrip time measuring section 205 calculates the roundtrip time tr based on the arrival time of the Measure frame 401 and the arrival time of the MeasureAck frame.

In the master apparatus 101, the roundtrip time measuring section 105 calculates the roundtrip time tr based on the transmission time of the Measure frame 401 and the arrival time of the MeasureAck frame 402.

In a terminal slave apparatus, the roundtrip time measuring section 205 calculates the roundtrip time tr based on the arrival time of the Measure frame 401 and the transmission time of the MeasureAck frame 402.

The offset value managing section 104 in the master apparatus 101 and the offset value managing section 204 in the slave apparatus 201 each record the roundtrip time tr in the offset value storing section 106 and the offset value storing section 206, with the MeasureID as a key.

In the (2) Offset calculation step (501 to 503), the offset value calculating section 103 in the master apparatus 101 calculates the offset value for the slave apparatus 201, which is an offset from the reception of the Sync frame 405 until the synchronization time point, based on the roundtrip time tr and the time is being the internal time of the master apparatus 101, which is from the transmission of the Sync frame 405 to the synchronization time point.

The calculation formula is: $o = ts - (tr/2)$.

Then, the offset value managing section 104 in the master apparatus 101 records the offset value o in the offset value storing section 106, with the Measure ID as a key.

In the (3) Notification step (501 to 503), the master apparatus 101 distributes the offset value o to each slave apparatus 201.

More specifically, the protocol processing section 102 in the master apparatus 101 transmits the Offset frame 403 via the same route as that of the Measure frame 401 described above, to distribute the offset value o to the slave apparatuses 201.

The Offset frame 403 includes the MeasureID, and thereby the measurement route can be specified.

As descried earlier, although the slave apparatus 1 belongs to two routes, the MeasureID enables the slave apparatus to specify the route which the Offset frame 403 is destined for.

In each slave apparatus 201, the protocol processing section 202 receives the Offset frame 403, and the offset value managing section 204 records the offset value o in the offset value storing section 206, with the MeasureID as a key.

In the (4) Confirmation step (504), the master apparatus 101 instructs each slave apparatus 201 to confirm the distributed offset value o thereto.

Specifically, the protocol processing section 102 in the master apparatus 101 broadcasts the Update frame 404 for notifying all the slave apparatuses 201 of the confirmation of the offset value o.

The Update frame 404 includes the SyncID.

In the slave apparatuses 201, the protocol processing section 202 receives the Update frame 403, and the offset value managing section 204 relates the latest offset value o at the present time with the SyncID included in the Update frame 403.

FIG. 6 and FIG. 7 show an example of a record table in the offset value storing section 106 in the master apparatus 101 and a record table in the offset value storing section 206 in the slave apparatus 201.

FIG. 6 shows an example of the record table in the offset value storing section 106 in the master apparatus 101.

FIG. 7 shows an example of the record table in the offset value storing section 206 in the slave apparatus 1 shown in FIG. 3.

Referring to FIG. 6, the table shows an example of only managing the offset value o with the SyncID and the Measure ID because the roundtrip time tr does not need to be held in the maser apparatus 101 after the offset value o is calculated.

In the (5) Synchronization step (505 to 507), the master apparatus 101 notifies the slave apparatuses 201 of a synchronization timing.

Specifically, the protocol processing section 102 in the master/apparatus 101 broadcasts the Sync frame 405 for notifying the slave apparatuses 201 of a synchronization timing.

The Sync frame 405 includes the SyncID, and thereby the roundtrip time tr for synchronization and the offset value o can be specified.

In each slave apparatus 201, the protocol processing section 202 receives the Sync frame 405, and the offset value managing section 204 retrieves from the offset value storing section 206 the roundtrip time tr and the offset value o which are related to the SyuncID included in the Sync frame 405, and outputs the retrieved roundtrip time tr and the offset value o to the delay time calculating section 203.

The delay time calculating section 203 calculates the delay time os which is a period of time between the receipt time of the Sync frame 405 and the synchronization time point, based on the input roundtrip time tr and offset value o.

The calculation formula is: $os = (tr/2) + o$.

Then, the delay time calculating section 203 performs a time-synchronization, with the time elapsed by the delay time os from the receipt time of the Sync frame 405 as the synchronization time.

In a system where nodes are added to a network or deleted from a network, the connection configuration changes, which may cause synchronization to be unstable or to fail by a conventional delay measurement.

In the synchronization system according to this embodiment, however, the use of the Measure ID and the SyncID allows the master apparatus 101 to apply the offset value of a more stable period for synchronization.

Figure 8:
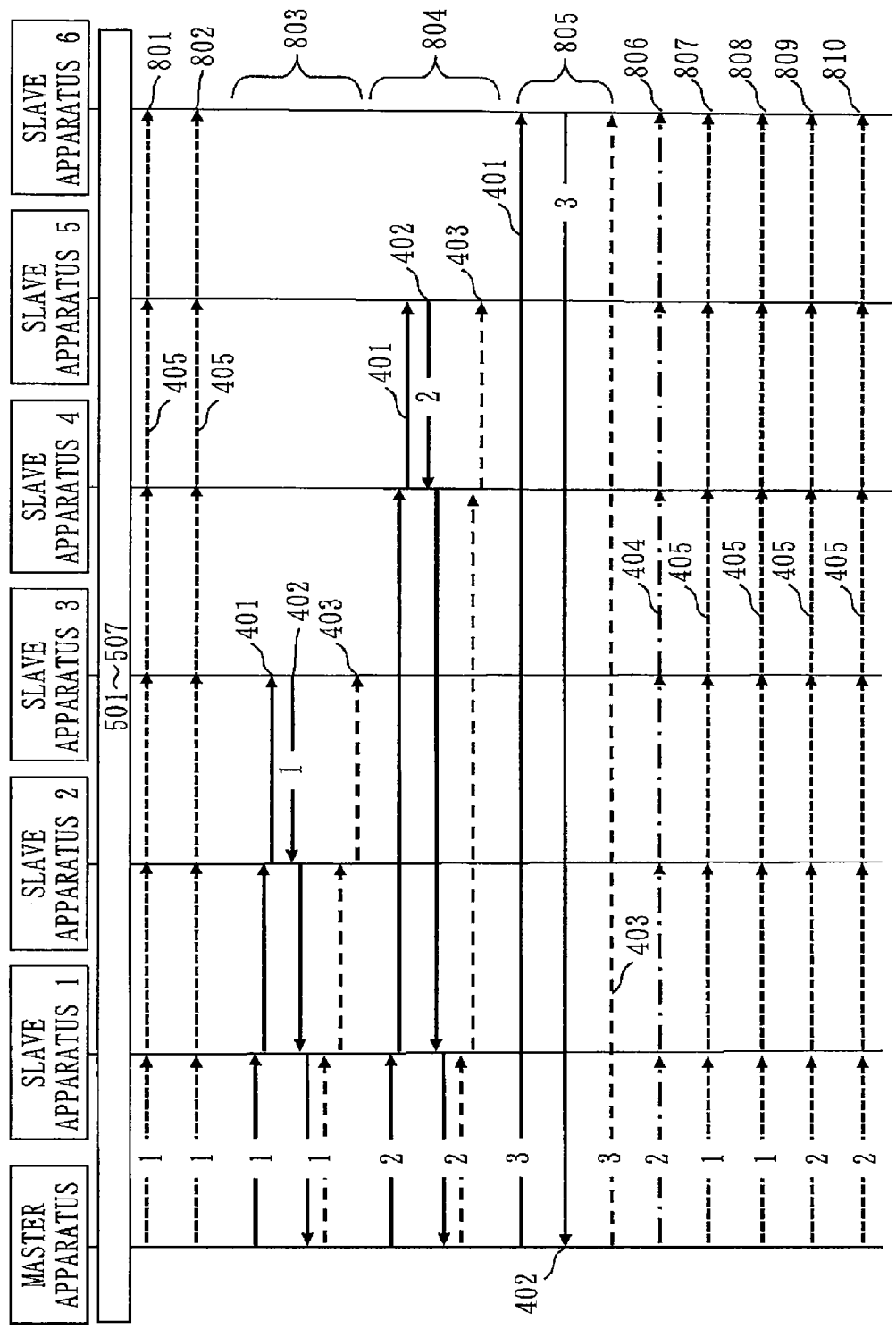
FIG. 8 shows examples of frame transmission/reception procedures between the master apparatus and slave apparatuses, according to the first embodiment.

This is illustrated in FIG. 8.

Referring to FIG. 8, the master apparatus 101 performs synchronization with the offset value o calculated in the first offset value calculation notification sequence (801 to 802) shown in FIG. 5.

Specifically, the protocol processing section 102 in the maser apparatus 101 transmits the Sync frame 405 that specifies SyncID=1 (sequence identifier for the first offset value calculation notification sequence) to each slave apparatus 201, and causes each slave apparatus 201 to perform synchronization with the roundtrip time tr and the offset value o in the first offset value calculation notification sequence.

Then, the master apparatus 101 executes a second offset value calculation notification sequence (803 to 805) with a system configuration change, or the like, as a trigger.

Then, synchronization is supposed to be performed according to the conventional art based on the roundtrip time tr and the offset value o in the second offset value calculation notification sequence (806). However, the roundtrip time tr and the offset value o in the second offset value calculation notification sequence are not applied immediately here.

The roundtrip time tr and the offset value o in the second offset value calculation notification sequence will be applied (809, 810) only after the roundtrip time tr and the offset value o in the first offset value calculation notification sequence have been applied for an appropriate period of time (807, 808), and when the master apparatus 101 determines that the system is stable.

More specifically, the protocol processing section 102 in the master apparatus 101 transmits the Sync frame 405 specifying SyncID=2 (sequence identifier for the second offset value calculation notification sequence) to each slave apparatus 201, to cause each slave apparatus 201 to perform synchronization with the roundtrip tr and the offset value o in the second offset value calculation notification sequence.

Thus, according to this embodiment, the application of the offset value can be controlled to achieve a more stable synchronization.

Thus, in this embodiment, a description is given of the synchronization system provided with the following master communication apparatus and the slave communication apparatuses.

The master communication apparatus that manages synchronization includes the following:

(a) the configuration to notify the transmission path delay measurement and the offset value until the synchronization time;

(b) the configuration to provide the transmission path delay measurement with the identifier, and manage the transmission path delay measurement and the offset value; and (c) the configuration to specify the offset value of the master communication apparatus based on the transmission path delay measurement identifier.

The slave communication apparatus for synchronization includes the following:

(a) the configuration to calculate the synchronization time based on the transmission path delay measurement and the notified offset value;

(b) the configuration to manage the transmission path delay measurement and the offset value based on the transmission path delay measurement identifier; and (c) the configuration to apply the offset value for synchronization which is specified by the master communication apparatus based on the transmission path delay measurement identifier.

Further in this embodiment, a description is given of the master communication apparatus further including the following:

(d) the configuration to provide the identifiers for the routes, and manage the transmission path delay measurement and the offset value.

Further, the slave communication apparatus further includes the following:

(d) the configuration to provide the identifiers for the routes, and manage the transmission path delay measurement and the offset value.

Embodiment 2

Figure 9:
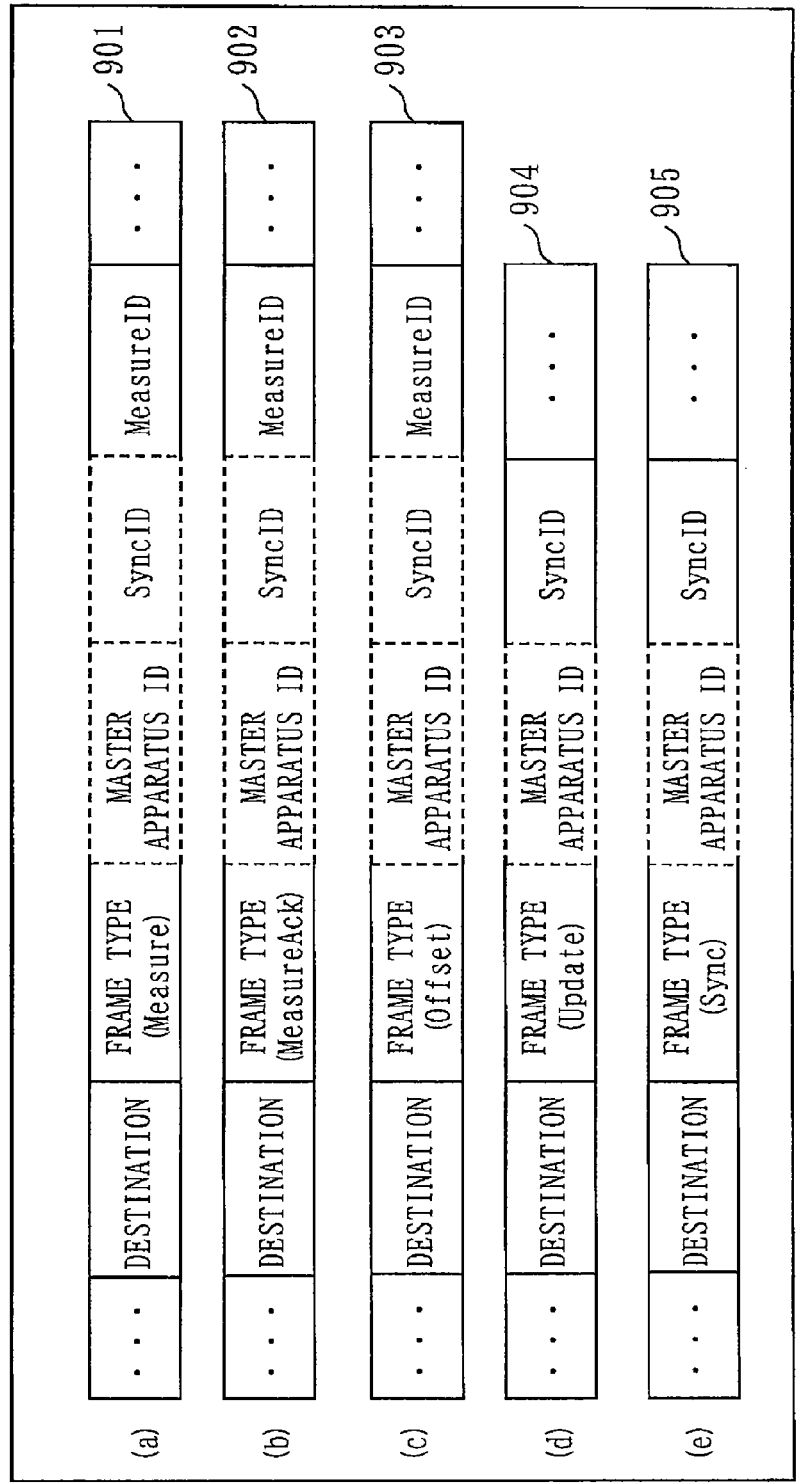
FIG. 9 shows examples of a frame transmitted/received between a master apparatus and slave apparatuses, according to a second embodiment and a third embodiment.

As seen in FIG. 9, a Measure frame 901, a MeasureAck frame 902, and an Offset frame 903 may include the SyncID.

In this case, measurement is made with the SyncID specified, and therefore the Update frame is not needed.

Thus, according to a second embodiment, the frame types are reduced which results in simplifying the synchronization system.

Embodiment 3

Further, as seen in FIG. 9, the Measure frame 901, the MeasureAck frame 902, the Offset frame 903, an Update frame 904, and a Sync frame 905 may include a master apparatus ID.

In this case, the master apparatus that holds a reference time for synchronization can be specified, and thus a single system is allowed to have a plurality of master apparatuses.

Thus, in a third embodiment, a description is given of the master communication apparatus further including the following:

(e) the configuration to provide the master apparatus with the identifier and manage the transmission path delay measurement and the offset value.

Further, a description is given of the slave communication apparatus further including the following:

(e) the configuration to provide the master apparatus with the identifiers and manage the transmission path delay measurement and the offset value.

Embodiment 4

Alternatively, instead of always transmitting the Offset frame on each measurement, the Offset frame may be transmitted as a substitute for the confirmation of a measurement.

Figure 10:
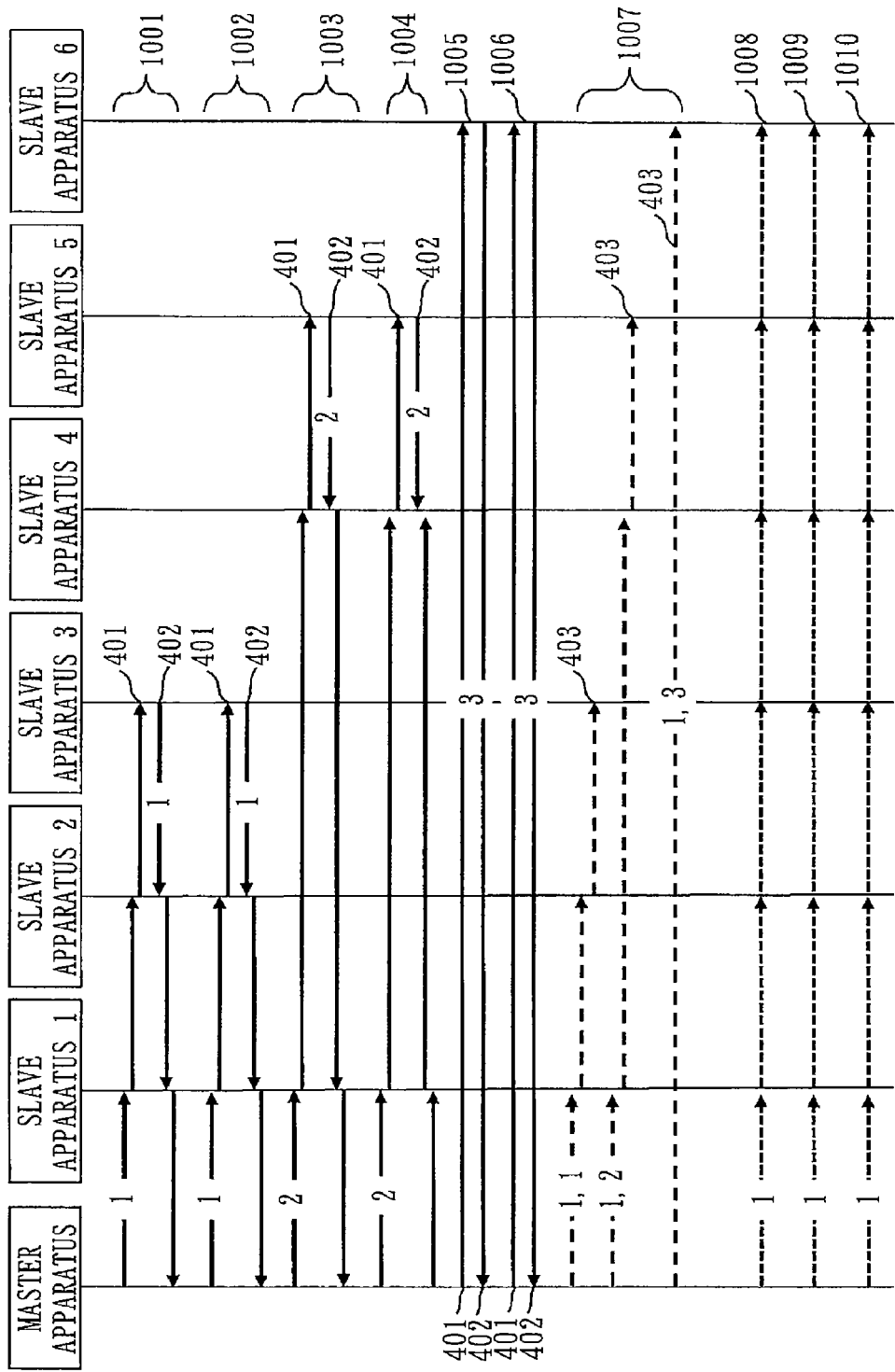
FIG. 10 shows examples of frame transmission/reception procedures between a master apparatus and slave apparatuses, according to a fourth embodiment.

FIG. 10 shows an application case example in which measurements are made twice on each route (1001 to 1006) to improve accuracy in measurement, and the resultant offset values are notified at one time (1007).

The Offset frame includes the SyncID and the MeasureID, which is a substitute for the Update frame.

In the Offset frames 403 transmitted in 1007 among (1, 1), (1, 2) and (1, 3), the first value is the SyncID and the second value is the MeasureID.

Thus, a fourth embodiment serves to reduce the number of Offset frames and eliminate the need of the Update frame.

As a result, the band of the overall system is reduced.

Lastly, a description is given of an example of the hardware configuration of the master apparatus 101 and the slave apparatus 201 shown in the first embodiment to the fourth embodiment.

Figure 11:
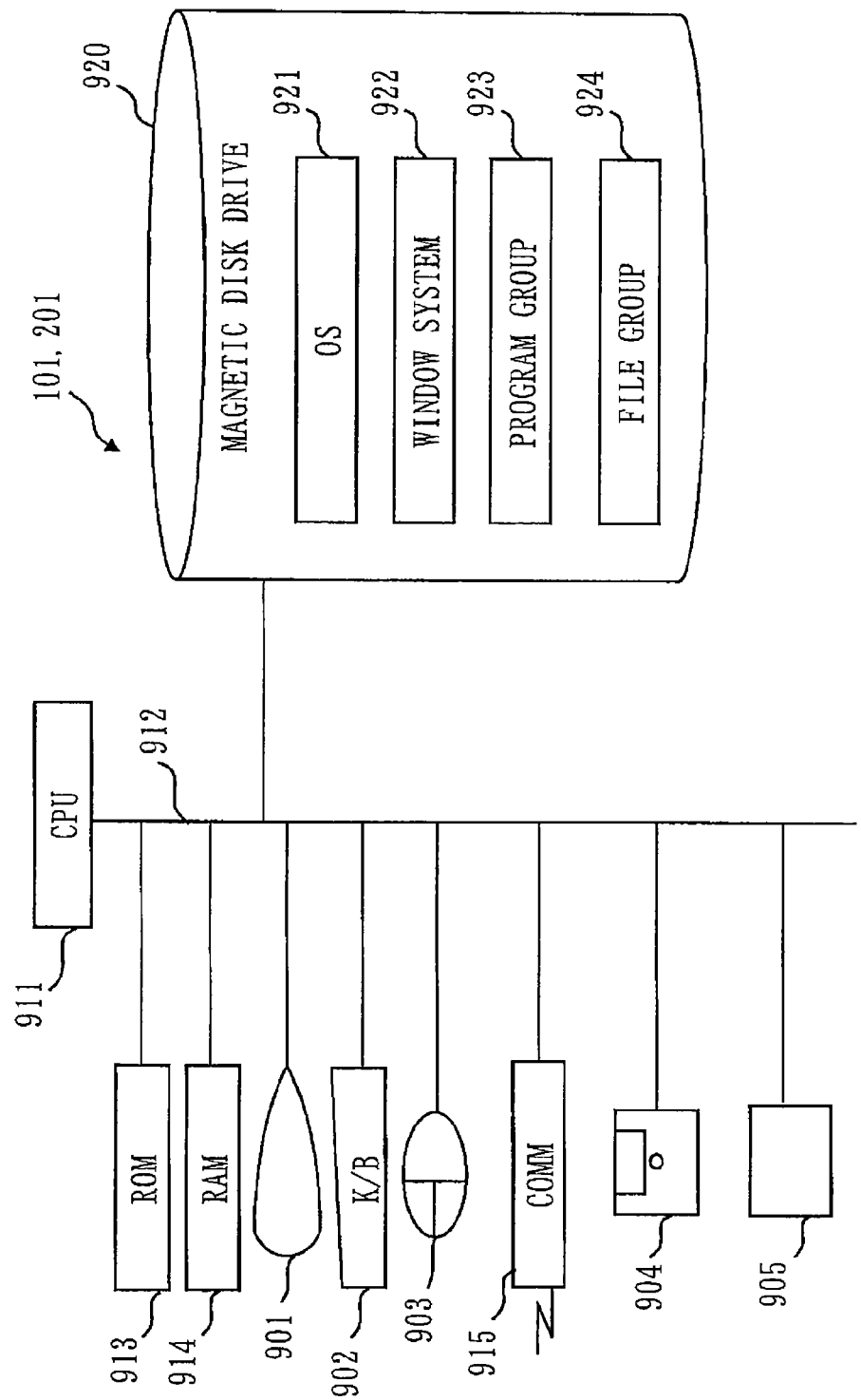
FIG. 11 shows a configuration example of the master apparatus and slave apparatuses, according to the first embodiment to the fourth embodiment.

FIG. 11 shows an example of the hardware resources of the master apparatus 101 and the slave apparatus 201 shown in the first embodiment to the fourth embodiment.

The configuration shown in FIG. 11 is just an example of the hardware configuration of the master apparatus 101 and the slave apparatus 201. The hardware configuration of the master apparatus 101 and that of the slave apparatus 201 are not limited to the FIG. 11 configuration, and may be of alternative configurations.

Referring to FIG. 11, the master apparatus 101 and the slave apparatus 201 are provided with a CPU 911 (referred to also as "central processing unit", "central processor", "processing unit", "arithmetic unit", "microprocessor", "microcomputer", or "processor") which executes programs.

The CPU 911 is connected via a bus 912 to, for example, a read only memory (ROM) 913, a random access memory (RAM) 914, a communication board 915, a display 901, a keyboard 902, a mouse 903 and a magnetic disk drive 920, and controls those hardware devices.

The CPU 911 may be connected further to a flexible disk drive (FDD) 904 and a compact disk drive (CDD) 905. The magnetic disk drive 920 may be replaced by a storage device such as a solid state drive (SSD), an optical disk drive, or a memory card (registered trademark) read/write drive.

The RAM 914 is an example of a volatile memory. The storage media such as the ROM 913, the FDD 904, the CDD 905, and the magnetic disk drive 920 are examples of non-volatile memories. Those are examples of storage devices.

The "offset value storing section 106" and the "offset value storing section 206" described in the first embodiment to the fourth embodiment are implemented with the RAM 914, the magnetic disk drive 920, and the like.

The communication board 915, the keyboard 902, the mouse 903, the FDD 904, and the like are examples of input devices.

The communication board 915, the display 901, and the like are examples of output devices.

The communication board 915 is connected to a network, as seen in FIG. 1.

For example, the communication board 915 may be connected to the Internet, a wide area network (WAN), a storage area network (SAN), or the like, besides the local area network (LAN).

The magnetic disk drive 920 stores an operating system (OS) 921, a window system 922, a program group 923, and a file group 924.

Programs in the program group 923 are executed by the CPU 911 using the operating system 921 and the window system 922.

The RAM 914 stores temporarily at least parts of the programs of the operating system 921 and application programs to be executed by the CPU 911.

The RAM 914 also stores various types of data needed for the CPU 911 processing.

The ROM 913 stores basic input/output system (BIOS) programs. The magnetic disk drive 920 stores boot programs.

At the start of the master apparatus 101 and the slave apparatus 201, the BIOS programs in the ROM 913 and the boot programs in the magnetic disk drive 920 are executed to activate the operating systems 921.

The program group 923 stores programs for executing functions that are described as a "section" (other than the "offset value storing section 106" and the "offset value storing section 206"; the same applies below) in the first embodiment to the fourth embodiment. Programs are retrieved and executed by the CPU 911.

The file group 924 stores, as a "file" item or a "database" item, information, data, a signal value, a variable value or a parameter that indicates a processing result of "determination", "calculation", "comparison", "evaluation", "updating", "setup", "registration", "selection", "inputting", "outputting", or the like described in the first embodiment to the fourth embodiment.

"Files" and "databases" are stored in a storage medium such as a disk or a memory.

Information, data, signal values, variable values or parameters stored in the storage medium such as a disk or a memory are retrieved into a main memory or a cache memory by the CPU 911 via a read/write circuit.

Retrieved information, data, signal values, variable values, or parameters are used in a CPU operation for extraction, retrieval, reference, comparison, computation, calculation, processing, editing, outputting, printing, displaying, or the like.

During a CPU operation for extraction, retrieval, reference, comparison, computation, calculation, processing, editing, outputting, printing, or displaying, information, data, signal values, variable values or parameters are stored temporarily in a main memory, a register, a cache memory, a buffer memory, or the like.

Arrows shown in the flow charts described in the first embodiment to the second embodiment mainly indicate the input/output of data or a signal.

Data or signal values are recorded in a record medium such as a memory in the RAM 914, a flexible disk in the FDD 904, a compact disk in the CDD 905, or a magnetic disk in the magnetic disk drive 920, or other record medium such as an optical disk, a minidisk, a DVD, or the like.

Data or signals are transmitted online via the bus 912, a signal line, a cable, or other transmission medium.

It is to be note that a "section" described in the first embodiment to the fourth embodiment may be a "circuit", a "device" or "equipment", or alternatively a "step", a "procedure", or a "process".

In other words, the steps, procedures, and processes illustrated in the flow charts described in the first embodiment to the fourth embodiment may implement the time-synchronization method performed by the master apparatus and the time-synchronization method performed by the slave apparatus according to the present invention.

Further, a "section" described therein may be implemented by firmware stored in the ROM 913.

Alternatively, the implementation may be made solely by software; or solely by hardware such as an element, a device, a board, wiring, or the like; or by a combination of software and hardware; or by a combination with firmware further added thereto.

Firmware and software are stored as a program in a record medium such as a magnetic disk, a flexible disk, an optical disk, a compact disk, a mini disk, a DVD, or the like.

The program is retrieved and executed by the CPU 911.

In other words, the program causes a computer to function as a "section" described in the first embodiment to the fourth embodiment, or causes a computer to execute the procedure or method of a "section" described in the first embodiment and the fourth embodiment.

Thus, the master apparatus 101 and the slave apparatus 201 described in the first embodiment to the fourth embodiment are computers provided with the CPU as a processer; a memory as a storing device; a magnetic disk, and the like; a keyboard, a mouse, a communication board, and the like, as input devices; a display, a communication board, and the like, as output devices; and the like.

Further, as described above, a function described as a "section" is implemented by using those processing devices, storing devices, input devices and output devices.

REFERENCE SIGNS LIST 101 master apparatus
102 protocol processing section
103 offset value calculating section
104 offset value managing section
105 roundtrip time measuring section
106 offset value storing section
201 slave apparatus
202 protocol processing section
203 delay time calculating section
204 offset value managing section
205 roundtrip time measuring section
206 offset value storing section

The invention claimed is:

1. A master apparatus which is connected to a plurality of slave apparatuses via a transmission path and performs time-synchronization with the plurality of slave apparatuses, comprising:
a sequence executing circuit that repeatedly executes an offset value calculation notification sequence in which an offset value for correcting a transmission path delay is calculated after communications with the plurality of slave apparatuses, and the offset value calculated is notified to the plurality of slave apparatuses;
a sequence identifier notifying circuit that notifies the plurality of slave apparatuses, every time the offset value calculation notification sequence is executed by the sequence executing circuit, of a sequence identifier which is an identifier of the offset value calculation notification sequence; and
an offset value instructing circuit that selects a sequence identifier from among sequence identifiers previously notified to the plurality of slave apparatuses by the sequence identifier notifying circuit, notifies the plurality of slave apparatuses of sequence identifier selected, and instructs the plurality of slave apparatuses to use, for the time-synchronization, an offset value notified in the offset value calculation notification sequence corresponding to the sequence identifier selected,
wherein the offset value instructing circuit selects the sequence identifier from the sequence identifies previously notified in response to detection of instability in the transmission path delay.

2. The master apparatus according to claim 1, wherein the offset value instructing circuit selects from among two or more sequence identifiers previously notified to the plurality of slave apparatuses, a sequence identifier other than the sequence identifier notified most recently to the plurality of slave apparatuses.

3. The master apparatus according to claim 1, wherein the offset value instructing circuit, after notifying the plurality of slave apparatuses of a sequence identifier, as the selected sequence identifier, from among two or more sequence identifiers previously notified to the plurality of slave apparatuses, selects before the sequence executing section executes a new offset value calculation notification sequence, another sequence identifier as the selected sequence identifier, notifies the plurality of slave apparatuses of the another sequence identifier selected, and instructs the plurality of slave apparatuses to use, for the time-synchronization, an offset value notified in the offset value calculation notification sequence corresponding to the another sequence identifier.

4. The master apparatus according to claim 1, wherein the offset value instructing circuit describes the selected sequence identifier in synchronization timing notification data for notifying the plurality of slave apparatuses of time-synchronization timing, transmits the synchronization timing notification data with the selected sequence identifier described to the plurality of slave apparatuses, and instructs the plurality of slave apparatuses to use, for the time-synchronization, an offset value notified in the offset value calculation notification sequence corresponding to the selected sequence identifier.

5. The master apparatus according to claim 4, wherein the offset value instructing circuit transmits to the plurality of slave apparatuses the synchronization timing notification data with an identifier of the master apparatus described.

6. The master apparatus according to claim 1, wherein the sequence identifier notifying circuit generates, every time the offset value calculation notification sequence is executed by the sequence executing section, sequence identifier notification data with the sequence identifier described of the offset value calculation notification sequence executed by the sequence executing section, and transmits the sequence identifier notification data generated to the plurality of slave apparatuses.

7. The master apparatus according to claim 1,
wherein:
the sequence executing circuit, in the offset value calculation notification sequence, transmits to the plurality of slave apparatuses delay measurement data used in a transmission path delay measurement and offset value notification data for notifying the offset value calculated,
the sequence identifier notifying circuit describes the sequence identifier of the offset value calculation notification sequence being executed by the sequence executing section, in at least one of the delay measurement data and the offset value notification data, and
the sequence executing circuit, in the offset value calculation notification sequence, transmits to the plurality of slave apparatuses at least one of the delay measurement data with the sequence identifier described and the offset value notification data with the sequence identifier described.

8. The master apparatus according to claim 1,
wherein:
the master apparatus is connected to a transmission path having a plurality of branch routes, on each of which one or more slave apparatuses are connected in cascade; and
in the offset value calculation notification sequence,
the sequence executing circuit generates, for each route, delay measurement data used in a transmission path delay measurement, describes a branch route identifier for a corresponding branch route in each delay measurement data, transmits to the transmission path each delay measurement data with the branch route identifier described, causes each slave apparatus on each route to transfer the delay measurement data, and causes the plurality of slave apparatuses to measure the transmission path delay.

9. The master apparatus according to claim 8, wherein the sequence executing circuit, in the offset value calculation notification sequence, generates, for each route, offset value notification data for notifying the offset value calculated, describes the branch route identifier for a corresponding branch route in each offset value notification data, transmits to the transmission path each offset value notification data with the branch route identifier described, causes each slave apparatus on each branch route to transfer the offset value notification data, and notifies the plurality of slave apparatuses of the offset value.

10. The master apparatus according to claim 1, wherein:
the master apparatus is connected to a transmission path having a plurality of slave apparatuses connected in cascade; and
in the offset value calculation notification sequence,
the sequence executing circuit:
executes at least twice an operation to transmit delay measurement data used in a transmission delay measurement to the transmission path, cause each slave apparatus to transfer the delay measurement data, cause each slave apparatus to transfer in the opposite direction, returned delay measurement data which is returned at the last slave apparatus, cause the plurality of slave apparatuses to measure the transmission path delay, and receive the returned delay measurement data;
calculates the offset value based on each difference between the transmission time of the delay measurement data and the receipt time of the returned delay measurement data; and
transmits offset value notification data for notifying a calculated offset value to the transmission path, causes each slave apparatus to transfer the offset value notification data, and notifies the plurality of slave apparatuses of the offset value.

11. A slave apparatus which is connected to a master apparatus via a transmission path and performs time-synchronization with the master apparatus, comprising:
a sequence executing circuit that repeatedly executes with the master apparatus an offset value calculation notification sequence which includes a data transmission/reception for calculating an offset value for correcting a transmission path delay, and a reception of a notification of the offset value calculated in the master apparatus;
a first data receiving circuit that receives, every time the offset value calculation notification sequence is executed, first sequence identifier notification data for notifying a sequence identifier, which is an identifier of the offset value calculation notification sequence, transmitted from the master apparatus;
an offset value storing circuit that stores the offset value notified in the offset value calculation notification sequence in relation to the sequence identifier of the offset value calculation notification sequence notified in the first sequence identifier notification data, the offset value storing section storing a plurality of offset values;
a second data receiving circuit that receives second selected sequence identifier notification data transmitted from the master apparatus for notifying a selected sequence identifier by the master apparatus; and
an offset value managing circuit that selects, as the offset value used for the time-synchronization with the master apparatus, one of the plurality of offset values previously stored in the offset value storing circuit, the one of the plurality of offset values selected corresponding to the selected sequence identifier notified in the second sequence identifier notification data,
wherein the offset value managing circuit selects the one of the plurality of offset values previously stored in response to detection of instability in the transmission path delay.

12. The slave apparatus according to claim 11, wherein the second data receiving circuit receives second sequence identifier notification data in which a sequence identifier other than the sequence identifier notified in the first sequence identifier notification data which is received most recently by the first data receiving circuit is notified as the selected sequence identifier.

13. The slave apparatus according to claim 11, wherein the second data receiving circuit receives, as the second sequence identifier notification data, synchronization timing notification data with the selected sequence identifier described, for notifying time-synchronization timing.

14. A time-synchronization method performed with a plurality of slave apparatuses by a master apparatus connected to the plurality of slave apparatuses via a transmission path, comprising:
repeatedly executing an offset value calculation notification sequence in which an offset value for correcting a transmission path delay is calculated after communications with the plurality of slave apparatuses, the offset value calculated is notified to the plurality of slave apparatuses;
notifying the plurality of slave apparatuses, every time the offset value calculation notification sequence is executed, of a sequence identifier which is an identifier for the offset value calculation notification sequence; and
selecting a sequence identifier from among sequence identifiers previously notified to the plurality of slave apparatuses, notifying the plurality of slave apparatuses of a selected sequence identifier, and instructing the plurality of slave apparatuses to use, for the time-synchronization, an offset value notified in the offset value calculation notification sequence corresponding to the selected sequence identifier,
wherein the sequence identifier from the sequence identifies previously notified is selected in response to detection of instability in the transmission path delay.

15. A time-synchronization method performed with a master apparatus by a slave apparatus connected to the master apparatus via a transmission path, comprising:
repeatedly executing, with the master apparatus, an offset value calculation notification sequence including data transmission/reception to calculate an offset value for correcting a transmission path delay, and reception of a notification of the offset value calculated in the master apparatus;
receiving, every time the offset value calculation notification sequence is executed, first sequence identifier notification data for notifying a sequence identifier which is an identifier of the offset value calculation notification sequence, transmitted from the master apparatus;
storing the offset value notified in the offset value calculation notification sequence in relation to the sequence identifier of the offset value calculation notification sequence notified in the first sequence identifier notification data, a plurality of offset values being stored;
receiving second selected sequence identifier notification data transmitted from the master apparatus for notifying a selected sequence identifier by the master apparatus; and
selecting, as the offset value used for the time-synchronization with the master apparatus, one of the plurality of offset values stored, the one of the plurality of offset values stored corresponding to the selected sequence identifier notified in the second sequence identifier notification data, wherein the one of the plurality of offset values previously stored is selected in response to detection of instability in the transmission path delay.

* * * * *